(12) United States Patent
Mitchell

(10) Patent No.: US 11,204,115 B2
(45) Date of Patent: Dec. 21, 2021

(54) THREADED CONNECTIONS FOR TUBULAR MEMBERS

(71) Applicant: National Oilwell Varco, L.P., Houston, TX (US)

(72) Inventor: John W. Mitchell, Bryan, TX (US)

(73) Assignee: National Oilwell Varco, L.P., Houston, TX (US)

( * ) Notice: Subject to any disclaimer, the term of this patent is extended or adjusted under 35 U.S.C. 154(b) by 220 days.

(21) Appl. No.: 16/516,884

(22) Filed: Jul. 19, 2019

(65) Prior Publication Data

US 2020/0025318 A1 Jan. 23, 2020

Related U.S. Application Data

(60) Provisional application No. 62/701,206, filed on Jul. 20, 2018.

(51) Int. Cl.
| | |
|---|---|
| *F16L 23/12* | (2006.01) |
| *F16L 25/02* | (2006.01) |
| *E21B 33/038* | (2006.01) |

(52) U.S. Cl.
CPC ............ *F16L 23/12* (2013.01); *E21B 33/038* (2013.01); *F16L 25/021* (2013.01)

(58) Field of Classification Search
CPC ....... F16L 23/12; F16L 25/021; F16L 15/009; F16L 15/06; F16L 15/004; E21B 33/038; E21B 33/0353; E21B 17/042
See application file for complete search history.

(56) References Cited

U.S. PATENT DOCUMENTS

| | | | | |
|---|---|---|---|---|
| 9,133,693 B2 * | 9/2015 | Wasa Tverlid | ....... | E21B 43/106 |
| 2002/0021006 A1 * | 2/2002 | Mallis | ................. | F16L 15/004 |
| | | | | 285/334 |
| 2003/0168858 A1 * | 9/2003 | Hashem | ................ | F16L 15/006 |
| | | | | 285/334 |
| 2013/0147191 A1 * | 6/2013 | Mazzaferro | ........... | E21B 17/042 |
| | | | | 285/390 |

\* cited by examiner

*Primary Examiner* — James G Sayre
(74) *Attorney, Agent, or Firm* — Conley Rose, P.C.

(57) ABSTRACT

A tubular member for threadably engaging another tubular member to form a tubular string includes a first end including a helical female thread formed in an outer surface of the tubular member, wherein the female thread includes a slot extending radially inwards from the outer surface, and a root extending radially inwards from the slot, wherein the root has a maximum width that is greater than a maximum width of the slot, a second end opposite the first end and including a helical male thread formed on an inner surface of the tubular member, wherein the male thread includes a shank extending radially outwards from the inner surface, and a notch extending radially outwards from the shank, wherein the notch has a maximum width that is greater than a maximum width of the shank.

19 Claims, 9 Drawing Sheets

THREADED CONNECTIONS FOR TUBULAR MEMBERS

CROSS-REFERENCE TO RELATED APPLICATIONS

The present application claims benefit of U.S. provisional patent application No. 62/701,206 filed on Jul. 20, 2018, and entitled "Threaded Connections for Tubular Members", which is incorporated herein by reference in its entirety.

STATEMENT REGARDING FEDERALLY SPONSORED RESEARCH OR DEVELOPMENT

Not applicable.

BACKGROUND

This disclosure relates to releasable connections between tubular members or bodies. In some aspects, this disclosure relates to connections between downhole tubulars, such as drill pipe joints, as are employed in drilling systems. For instance, in some rotary drilling applications, a drill bit is attached to the lower end of a drill string composed of lengths of tubular drill pipe and other components joined together by tool joints with rotary shouldered threaded connections (RSTCs). In this disclosure, the term "drill string" is used herein to include all arrangements in which pipes or other tubulars are threaded together end-to-end, including pipelines, risers and all downhole tubular strings such as drill strings and work strings. For clarity, the term is not limited only to tubular strings used in drilling a borehole. Furthermore, the tubular members that make up a drill string may also be substituted with other rods, shafts, or other cylindrical members that may be used at the surface and which may require a releasable connection. In some applications, the drill string includes threads that are engaged by right hand and/or left hand rotation. The threaded connections are generally configured to sustain the weight of the drill string, withstand the strain of repeated make-up and break-out, resist fatigue, resist additional make-up during drilling, provide a leak proof seal, and/or not loosen during normal operations.

For example, the rotary drilling process may subject the drill string to significant dynamic tensile stresses, dynamic bending stresses and/or dynamic rotational stresses. Additionally, the tool joints or pipe connections in the drill string include appropriate shoulder area, thread pitch, shear area and friction to transmit the required drilling torque. In some applications, a minimum make-up torque is applied to the tool joint during make-up of the tool joint, the minimum make-up torque corresponding to the minimum amount of torque necessary to develop a desired tensile stress in the external thread or compressive stress in the internal thread of the tool joint, where the desired stress level is sufficient in most conditions to prevent downhole separation or break-up and to prevent shoulder separation arising from bending loads.

BRIEF SUMMARY OF THE DISCLOSURE

An embodiment of a tubular member for threadably engaging another tubular member to form a tubular string comprises a first end comprising a helical female thread formed in an outer surface of the tubular member, wherein the female thread comprises a slot extending radially inwards from the outer surface, and a root extending radially inwards from the slot, wherein the root has a maximum width that is greater than a maximum width of the slot, a second end opposite the first end and comprising a helical male thread formed on an inner surface of the tubular member, wherein the male thread comprises a shank extending radially outwards from the inner surface, and a notch extending radially outwards from the shank, wherein the notch has a maximum width that is greater than a maximum width of the shank. In some embodiments, the first end comprises a pin end and the second end comprises a box end. In some embodiments, the maximum width of the notch of the male thread is greater than the maximum width of the slot of the female thread. In certain embodiments, the first end comprises a plurality of the female threads and the second end comprises a plurality of the male threads. In certain embodiments, the root of the female thread is defined by a concave inner surface and the notch of the male thread is defined by a convex outer surface. In some embodiments, the interface between the slot and the root of the female thread forms a pair of convex shoulders, and the interface between the shank and the notch of the male thread forms a pair of concave recesses. In some embodiments, the first end comprises an annular shoulder and an annular sealing surface positioned axially between the female thread and the shoulder, and wherein the shoulder is disposed at an acute angle relative to a central axis of the tubular member and configured to provide a radially directed force against the sealing surface in response to coupling the tubular member with an adjacent tubular member. In certain embodiments, the male thread and the female thread each comprise a dovetail shaped cross-sectional profile.

An embodiment of a tubular member for threadably engaging another tubular member to form a tubular string comprises a first end comprising a helical female thread formed in an outer surface of the tubular member, wherein the female thread comprises a slot extending radially inwards from the outer surface, a root extending radially inwards from the slot, wherein the root is defined by a concave inner surface, and a pair of convex curved shoulders extending between the slot and the root, a second end opposite the first end and comprising a helical male thread formed on an inner surface of the tubular member, wherein the male thread comprises a shank extending radially outwards from the inner surface, a notch extending radially outwards from the shank, wherein the notch is defined by a convex outer surface, and a pair of concave curved shoulders extending between the shank and the notch. In some embodiments, the slot of the female thread is defined by a pair of opposing first planar surfaces and the shank of the male thread is defined by a pair of opposing second planar surfaces. In some embodiments, the root of the female thread has a maximum width that is greater than a maximum width of the slot of the female thread, and the notch of the male thread has a maximum width that is greater than a maximum width of the shank of the male thread. In certain embodiments, the first end comprises a plurality of the female threads and the second end comprises a plurality of the male threads. In certain embodiments, the first end comprises an annular shoulder and an annular sealing surface positioned axially between the female thread and the shoulder, and wherein the shoulder is disposed at an acute angle relative to a central axis of the tubular member to provide a radially directed force against the sealing surface in response to coupling the tubular member with an adjacent tubular member. In some embodiments, the first end comprises a pin end and the second end comprises a box end.

An embodiment of a tubular member for threadably engaging another tubular member to form a tubular string comprises a first end comprising an annular first shoulder, a first helical thread, and an annular first sealing surface positioned axially between the first helical thread and the first shoulder, wherein the first shoulder is disposed at an acute angle relative to a central axis of the tubular member to provide a radially directed force against the first sealing surface in response to coupling the tubular member with an adjacent tubular member. In some embodiments, the first end further comprises an annular second sealing surface axially spaced from the first sealing surface and an annular second shoulder axially spaced from the first shoulder, and wherein the second sealing surface is positioned axially between the first helical thread and the second shoulder, and the second shoulder is disposed at an acute angle relative to the central axis of the tubular member to provide a radially directed force against the second sealing surface in response to coupling the tubular member with an adjacent tubular member. In some embodiments, the first helical thread comprises a slot extending radially inwards from the outer surface, and a root extending radially inwards from the slot, and wherein the root has a maximum width that is greater than a maximum width of the slot. In certain embodiments, the first helical thread comprises a pair of convex curved shoulders extending between the slot and the root, wherein the root of the first helical thread is defined by a concave inner surface. In certain embodiments, the tubular member further comprises a second end opposite the first end that comprises an annular second shoulder, a second helical thread, and an annular second sealing surface positioned axially between the second helical thread and the second shoulder, wherein the second shoulder is disposed at an acute angle relative to the central axis of the tubular member to provide a radially directed force against the second sealing surface in response to coupling the tubular member with an adjacent tubular member. In some embodiments, the second helical thread comprises a shank extending radially outwards from the inner surface, and a notch extending radially outwards from the shank, and wherein the notch has a maximum width that is greater than a maximum width of the shank.

BRIEF DESCRIPTION OF THE DRAWINGS

For a detailed description of the exemplary embodiments of the disclosure that are presented herein, reference will now be made to the accompanying drawings in which.

DETAILED DESCRIPTION

Figure 1:
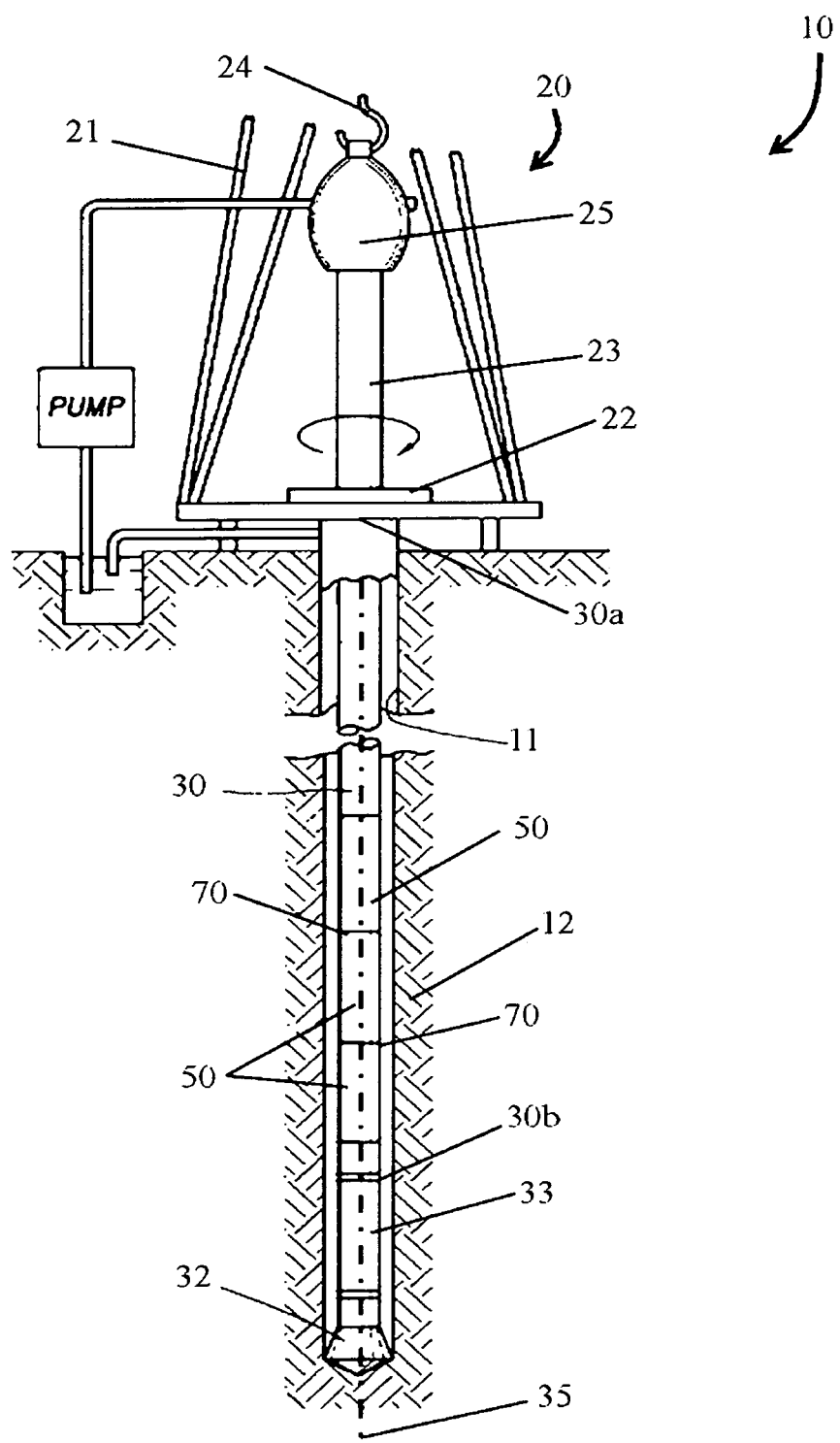
FIG. 1 is a schematic view of an embodiment of a drilling system in accordance with the principles described herein.
Figure 2:
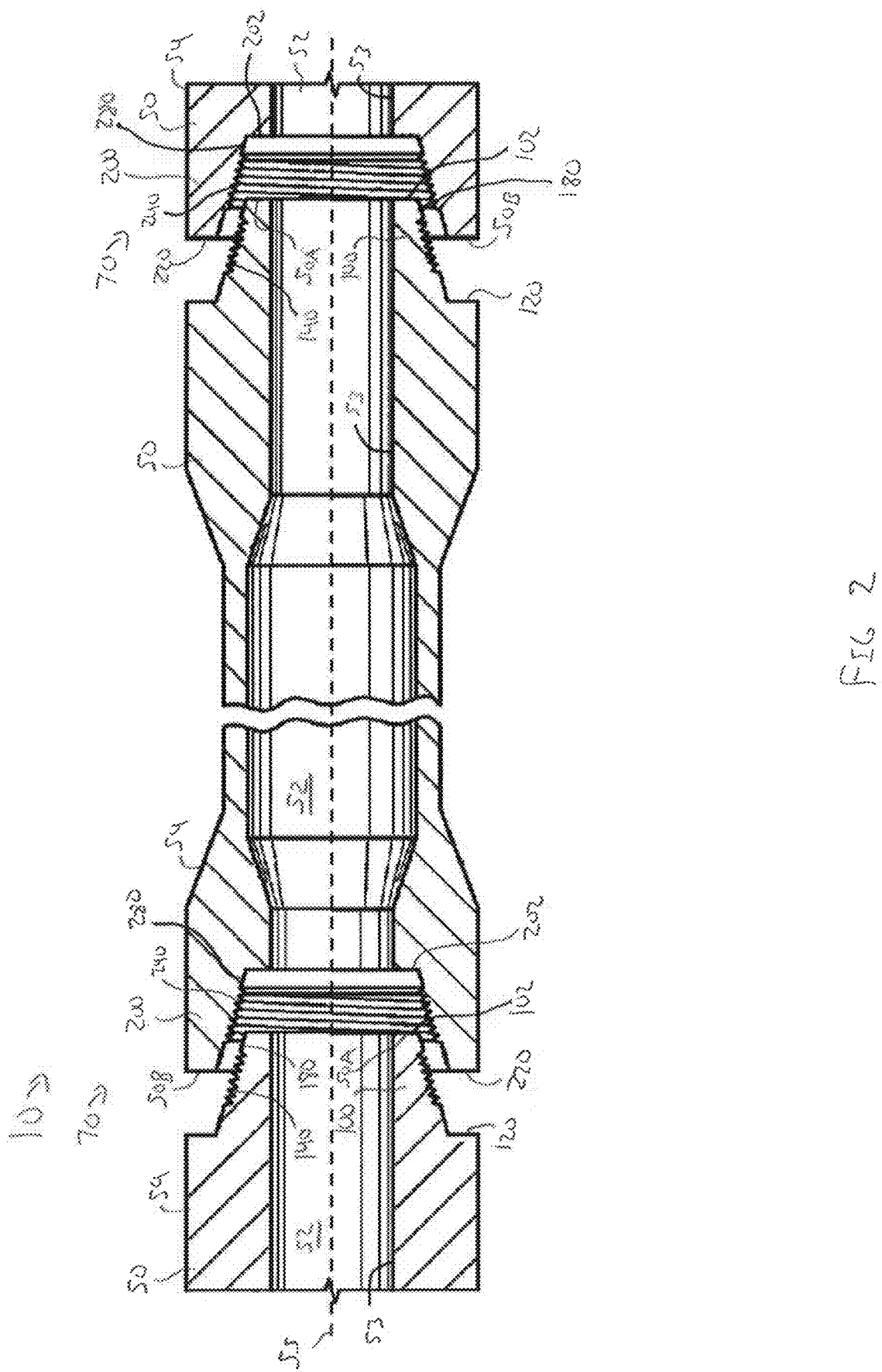
FIG. 2 is a schematic, side cross-sectional view of a portion of an embodiment of a drill string of the drilling system of FIG. 1 in accordance with principles disclosed herein.
Figure 3:
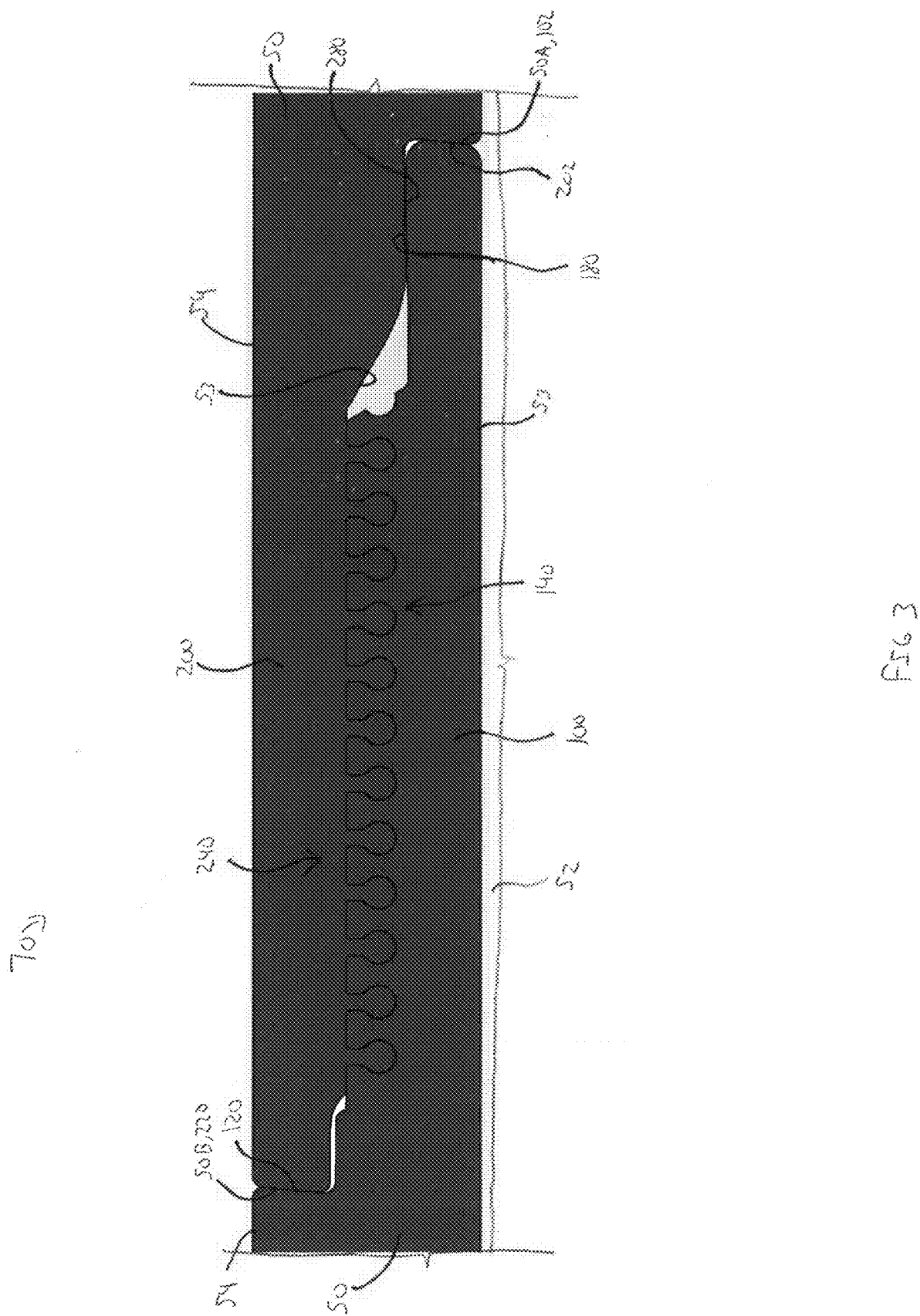
FIG. 3 is a side cross-sectional view of an embodiment of a tool joint formed between a pair of drill pipes in accordance with principles disclosed herein.
Figure 4:
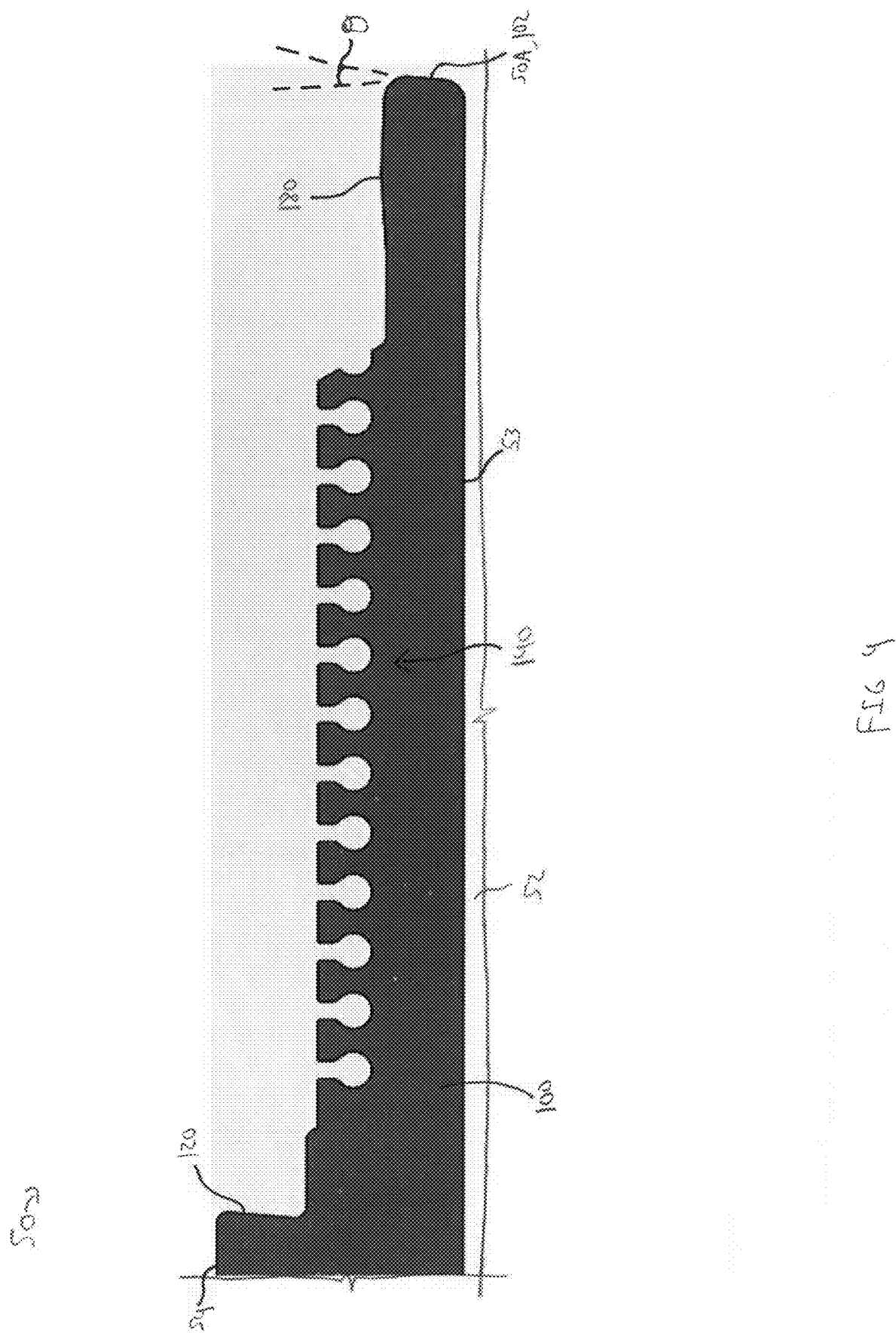
FIG. 4 is a side cross-sectional view of a box end of one of the drill pipes of FIG. 3.
Figure 5:
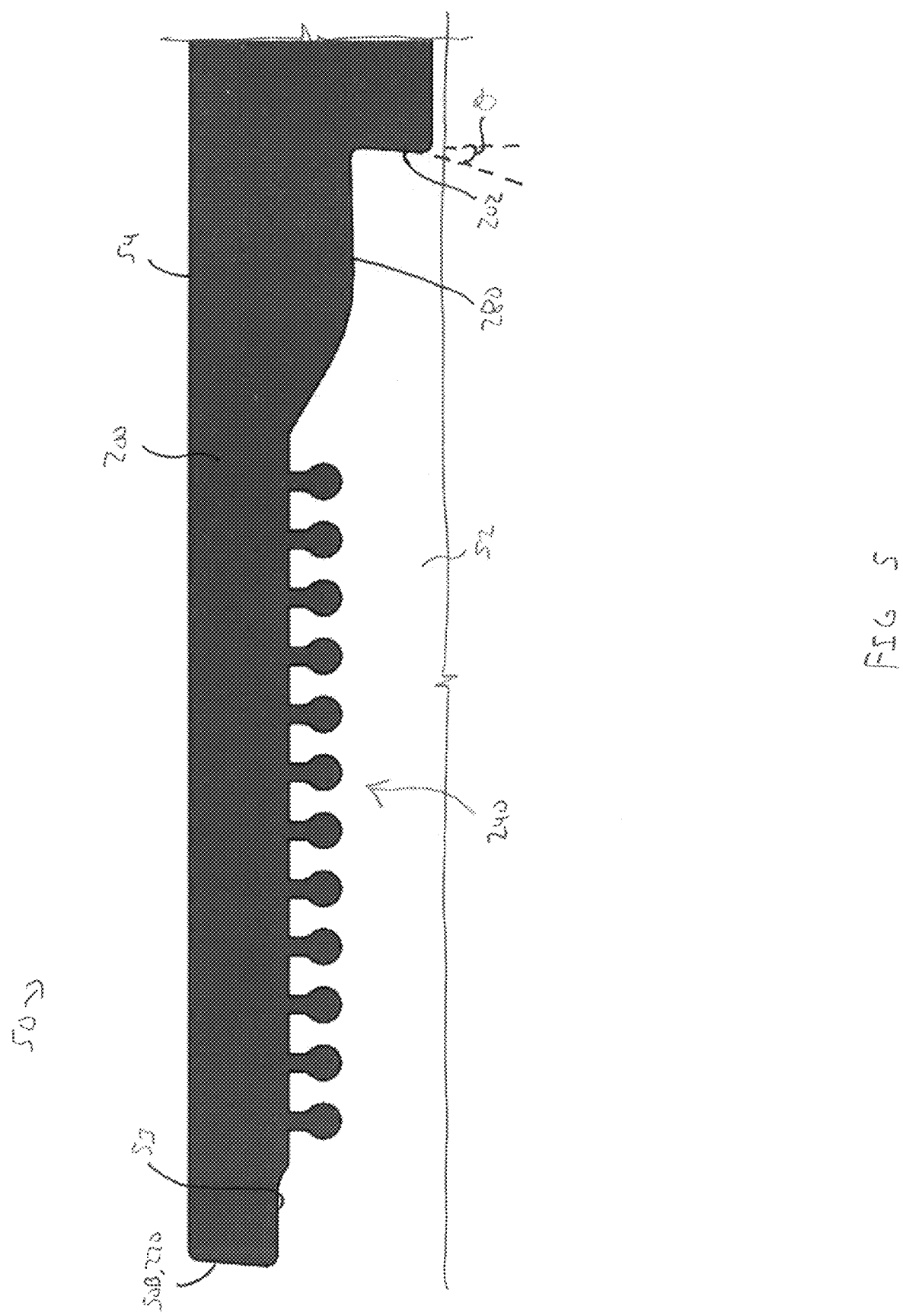
FIG. 5 is a side cross-sectional view of a pin end of one of the drill pipes of FIG. 3.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. Further, "couple" or "couples" may refer to coupling via welding or via other means, such as releasable connections using a connector, pin, key or latch. In addition, as used herein, the terms "axial" and "axially" generally mean along or parallel to a given axis (e.g., given axis of a body or a port), while the terms "radial" and "radially" generally mean perpendicular to the given axis. For instance, an axial distance refers to a distance measured along or parallel to the given axis, and a radial distance means a distance measured perpendicular to the given axis.

Referring to FIG. 1, an embodiment of a well or drilling system 10 is schematically shown. In this embodiment, drilling system 10 includes a drilling rig 20 positioned over a borehole 11 penetrating a subsurface formation 12 and a drill string 30 suspended in borehole 11 from a derrick 21 of rig 20. Elongate drill string 30 has a central or longitudinal axis 35, a first or upper end 30a, and a second or lower end 30b opposite end 30a. In addition, drill string 30 includes a drill bit 32 at lower end 30b, a bottomhole assembly (BHA) 33 axially adjacent bit 32, and a plurality of interconnected tubular members or drill pipe joints 50 extending between BHA 33 and upper end 30a. BHA 33 and drill pipes 50 are coupled together end-to-end at tool joints or connections 70. As will be discussed further herein, in this embodiment, connections 70 comprise double shouldered RSTCs. In general, BHA 33 can include drill collars, drilling stabilizers, a mud motor, directional drilling equipment, a power generation turbine, as well as capabilities for measuring, processing, and storing information, and communicating with the surface (e.g., MWD/LWD tools, telemetry hardware, etc.).

In this embodiment, drill bit 32 is rotated by rotation of drill string 30 at the surface. In particular, drill string 30 is rotated by a rotary table 22, which engages a kelly 23 coupled to upper end 30a. Kelly 23, and hence drill string 30, is suspended from a hook 24 attached to a traveling block (not shown) with a rotary swivel 25 which permits rotation of drill string 30 relative to hook 24. Although drill bit 32 is rotated from the surface with drill string 30 in this embodiment, in general, the drill bit (e.g., drill bit 32) can be rotated via a rotary table and/or a top drive, rotated by downhole mud motor disposed in the BHA (e.g., BHA 33), or by combinations thereof (e.g., rotated by both rotary table via the drill string and the mud motor, rotated by a top drive and the mud motor, etc.). Thus, it should be appreciated that the various aspects disclosed herein are adapted for employment in each of these drilling configurations and are not limited to conventional rotary drilling operations.

Referring to FIGS. 2-9, an embodiment of a plurality of drill pipe joints 50 of which the drill string 30 of drilling system 10 of FIG. 1 is shown in FIGS. 2-9. In the embodiment of FIGS. 2-9, each drill pipe joint 50 has a central or longitudinal axis 55 and generally includes a terminal first end 50A, a terminal second end 50B opposite first end 50A, a central bore or passage 52 defined by a generally cylindrical inner surface 53 extending between ends 50A, 50B, and a generally cylindrical outer surface 54 extending between ends 50A, 50B. Additionally, each drill pipe joint 50 includes a pin or pin end 100 extending from first end 50A and a box or box end 200 extending from second end 50B. As will be described further herein, the pin end 100 of a first drill pipe joint 50 is insertable into the box end 200 of an adjacent second drill pipe joint 50 to form or define a connection 70 therebetween (pin ends 100 are shown partially inserted into adjacent box ends 200 in FIG. 2).

In this embodiment of FIGS. 2-9, the pin end 100 of each drill pipe joint 50 comprises an axial portion of the drill pipe joint 50 extending between a primary or radially inner shoulder 102 that defines the first end 50A of the drill pipe joint 50, and a secondary or radially outer shoulder 120 that is axially spaced from first end 50A. As will be described further herein, pin end 100 also includes a generally annular pin thread form 140 and an annular sealing surface 180 positioned axially between inner shoulder 102 and pin thread form 140. In this embodiment, the box end 200 of each drill pipe joint 50 comprises an axial portion of the drill pipe joint 50 extending between a primary or radially inner shoulder 202 that is spaced from second end 50B, and a secondary or radially outer shoulder 220 that defines the second end 50B of the drill pipe joint 50. As will be described further herein, box end 200 also includes a generally annular box thread form 240 and an annular sealing surface 280 positioned axially between outer shoulder 220 and box thread form 240.

Figure 6:
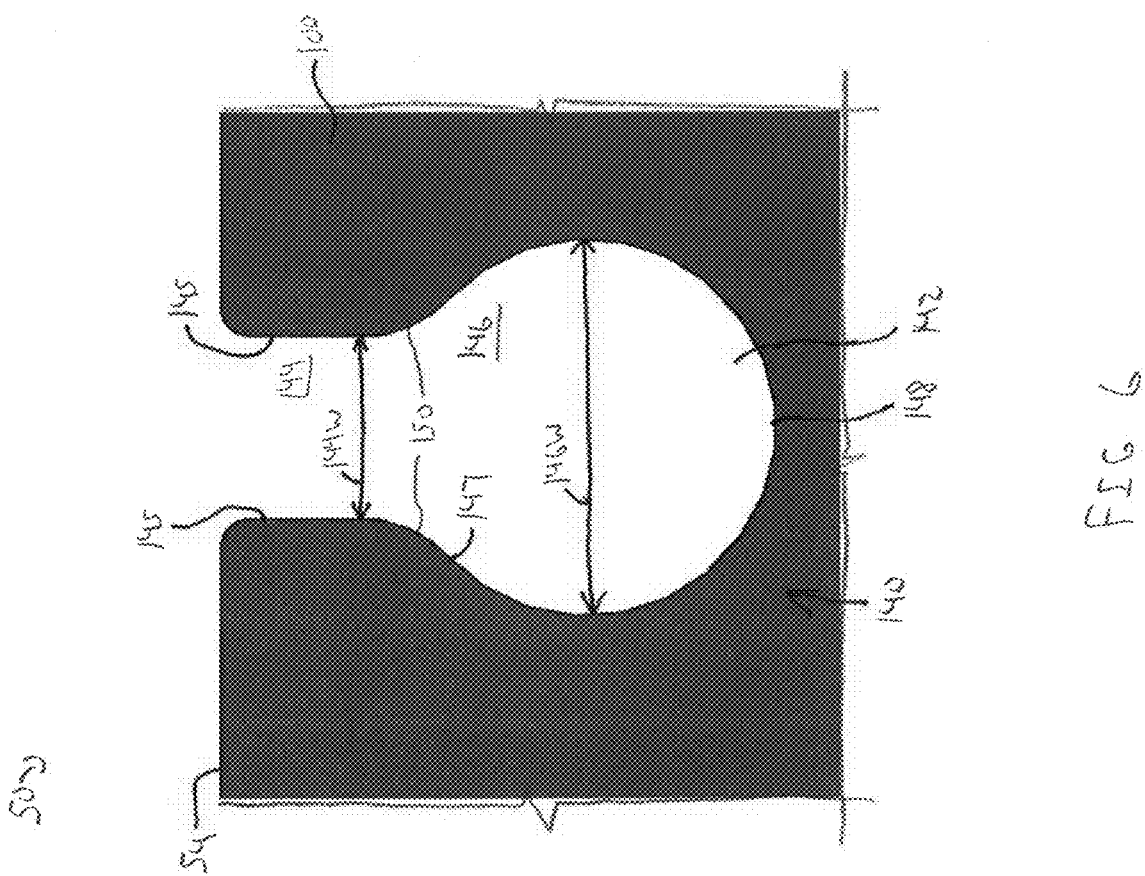
FIG. 6 is a side cross-sectional view of an embodiment of a female thread form of the drill pipes of FIG. 3 in accordance with principles disclosed herein.

As shown particularly in FIG. 6, the pin thread form 140 of pin end 100 comprises a plurality of female helical threads or grooves 142 formed in the outer surface 54 of drill pipe joint 50. In this embodiment, pin thread form 140 comprises a "triple-start thread" including three separate helical threads 142; however, in other embodiments, pin thread form 140 may include different numbers of helical threads 142 formed in outer surface 54, including a "single-start thread" including only a single helical thread 142. Each helical thread 142 is formed entirely within, and thus, does not project radially outwards from (relative to central axis 55) the cylindrical outer surface 54 of drill pipe joint 50. Additionally, each helical thread 142 has a dovetail-shaped cross-sectional profile including a slot 144 extending from outer surface 54 and a rounded or circular root 146 that defines a radially inner terminal end 148 of the helical thread 142. In this arrangement, a radially outer end of the slot 144 defines the major diameter of each helical thread 142 while the inner terminal end 148 of root 146 defines the minor diameter of each helical thread 142.

In the embodiment of FIGS. 2-9, the slot 144 of each helical thread 142 has a rectangular cross-sectional profile defined by a pair of planar surfaces or edges 145 while the root 146 of each helical thread 142 has a circular cross-sectional profile defined by a concave curved surface 147. In other embodiments, the edges 145 defining slot 144 may be nonplanar, comprising curved surfaces, for instance. Additionally, in other embodiments, the root 146 of each helical thread 142 may comprise different cross-sectional profiles (e.g., rectangular, triangular, etc.) while still providing helical thread 142 with a dovetail shape. The slot 144 of each helical thread 142 has a maximum width 144W extending between edges 145 while root 146 has a maximum width 146W extending across curved surface 147, where maximum width 146W of root 146 is greater than the maximum width 144W of slot 144. The interface between slot 144 and root 146 of each helical thread 142 forms a pair of convex curved shoulders 150 as the width of helical thread 142 decreases moving radially outwards from root 146 towards slot 144.

Figure 7:
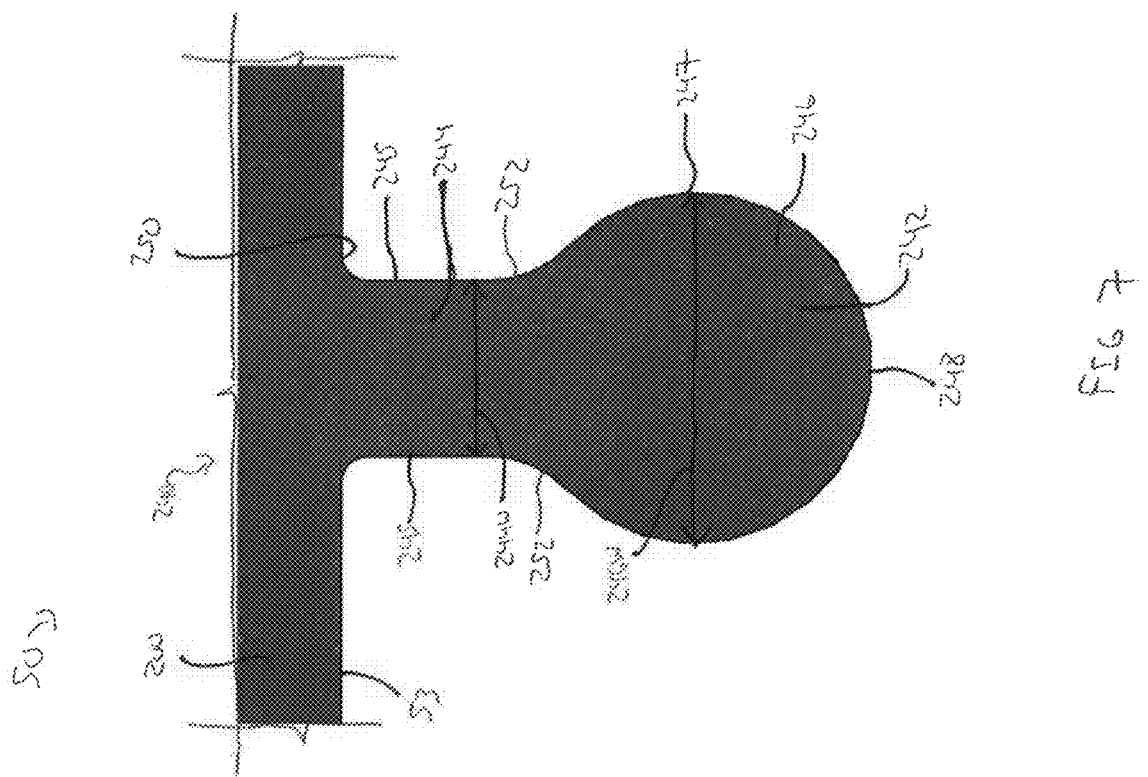
FIG. 7 is a side cross-sectional view of an embodiment of a male thread form of the drill pipes of FIG. 3 in accordance with principles disclosed herein.

As shown particularly in FIG. 7, the box thread form 240 of box end 200 comprises a plurality of male helical threads 242 extending radially inwards from the inner surface 53 of drill pipe joint 50. In this embodiment, box thread form 240 comprises a "triple-start thread" including three separate helical threads 242; however, in other embodiments, box thread form 240 may include different numbers of helical threads 242 formed on inner surface 53, including a "single-start thread" including only a single helical thread 242. Each helical thread 242 is dovetail-shaped including a shank 244 extending from inner surface 53 and a rounded or circular notch 246 that defines a radially inner terminal end or crest 248 of the helical thread 242. In this arrangement, a radially outer end or root 250 of the shank 244 defines the major diameter of each helical thread 242 while the crest 248 of notch 246 defines the minor diameter of each helical thread 242.

In this embodiment, the shank 244 of each helical thread 242 has a rectangular cross-sectional profile defined by a pair of planar surfaces or edges 245 while the notch 246 of each helical thread 242 has a circular cross-sectional profile defined by a convex curved surface 247. In other embodiments, the edges 245 defining shank 244 may be nonplanar, comprising convex curved surfaces, for instance. Additionally, in other embodiments, the notch 246 of each helical thread 242 may comprise different cross-sectional profiles (e.g., rectangular, triangular, etc.) while still providing helical thread 242 with a dovetail shape. The shank 244 of each helical thread 242 has a maximum width 244W extending between edges 245 while notch 246 has a maximum width 246W extending across curved surface 247, where maximum width 246W of notch 246 is greater than the maximum width 244W of shank 244. The interface between shank 244 and notch 246 of each helical thread 242 forms a pair of curved or concave recesses 252 as the width of helical thread 242 decreases moving radially outwards from notch 246 towards shank 244.

Figure 8:
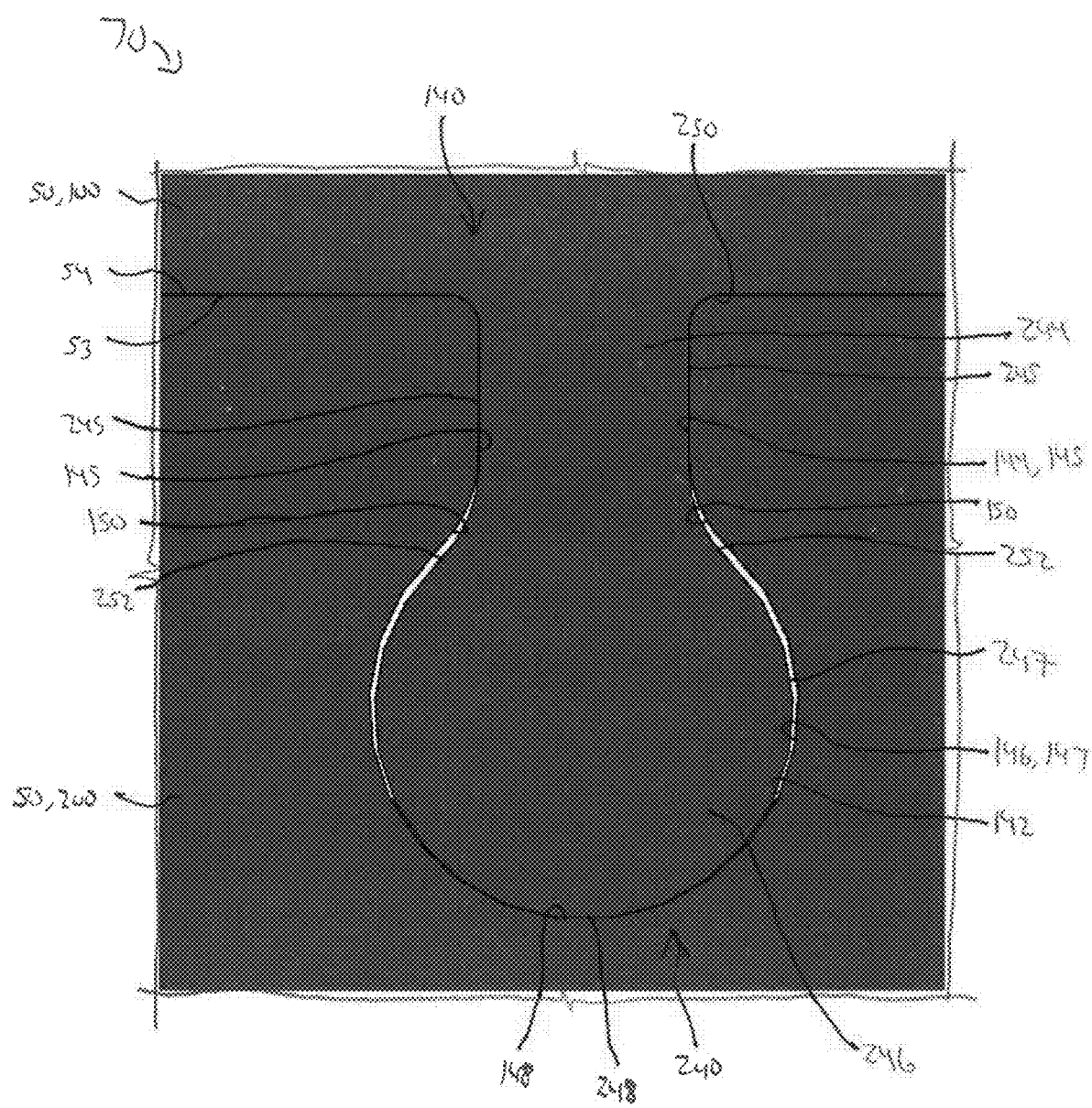
FIG. 8 is an enlarged, cross-sectional view of the thread forms of FIGS. 6, 7 engaged with one another.

As shown particularly in FIG. 8, when the pin end 100 and the box end 200 of adjacent drill pipe joints 50 are threadably connected to form connection 70, helical threads 142 of the pin end 140 of a first drill pipe joint 50 are interlockingly received within the corresponding helical threads 242 of the box end 200 of a second drill pipe joint 50. Particularly, the notch 246 of helical threads 242 are slidingly received in corresponding roots 146 of helical threads 142 while shanks 244 of helical threads 242 are slidingly received in the slots 144 of helical threads 142. In this embodiment, the maximum width 246W of each notch 246 is slightly larger than the maximum width 146W of each corresponding root 146 while the maximum width 244W of each shank 244 is slightly larger than the maximum width 144W of each corresponding slot 144. In this embodiment, the radius of curvature of the curved surface 147 of root 146 and of the curved surface 247 of notch 246 is approximately between 0.15" and 0.22"; however, in other embodiments, the radius of curvature of each surface 147 and 247 may vary. Additionally, the radially extending length of each slot 144 and each shank 244 is approximately between 0.08" and 0.12"; however, in other embodiments, the radially extending length of each slot 144 and shank 244 may vary. In this embodiment, the pin thread form 140 of pin end 100 and the box thread form 240 of box end 200 each has a pitch of approximately 0.3 threads per inch and a thread taper of approximately between 0° and 3.7° taper per foot; however, in other embodiments, the pitch and taper of thread forms 140 and 240 may vary. In some embodiments, crest 248 of the notch 246 of each helical thread 242 may be truncated to provide a space between crest 248 and the inner terminal end 148 of the root 146 in which the notch 246 is received to permit the communication or transport of materials (e.g., drill pipe joint lubricant, etc.) therethrough. In some embodiments, crest 248 may be truncated approximately between 0.010" and 0.015"; however, in other embodiments, the amount of truncation of crest 248 may vary.

During operation of the drilling system 10 shown in FIG. 1, an excessive degree of torque may be applied to adjacent drill pipe joints 50 during their makeup to form a connection 70 therebetween. The "overtorquing" of the adjacent drill pipe joints 50 may result in radially directed or bending forces (e.g., buckling) being applied to the corresponding pin end 100 and box end 200 of the adjacent drill pipe joints 50 in response to excessively forcible contact between the inner shoulder 102 of pin end 100 and inner shoulder 202 of box end 200 (shoulders 102 and 202 forming the primary load shoulder of the connection 70), and between the outer shoulder 120 of pin end 100 and the outer shoulder 220 of box end 200 (shoulders 120 and 220 forming the secondary load shoulder of the connection 70). In response to the application of bending forces to pin end 100 and box end 200 resulting from overtorquing of the connection 70, outer surface 247 of the notch 246 of each helical thread 242 engages or contacts the shoulders 150 of each corresponding helical thread 142, thereby preventing helical threads 242 from disengaging from the corresponding helical threads 142. By preventing helical thread 242 from disengaging from helical threads 142, stress is more evenly distributed across pin thread form 140 and box thread form 240, thereby increasing the strength of the connection 70. Moreover, the interlocking engagement between threads 142, 242 draws the sealing surfaces 180, 280 of pin end 100 and box end 200 together to increase the sealing integrity formed between ends 100, 200.

Figure 9:
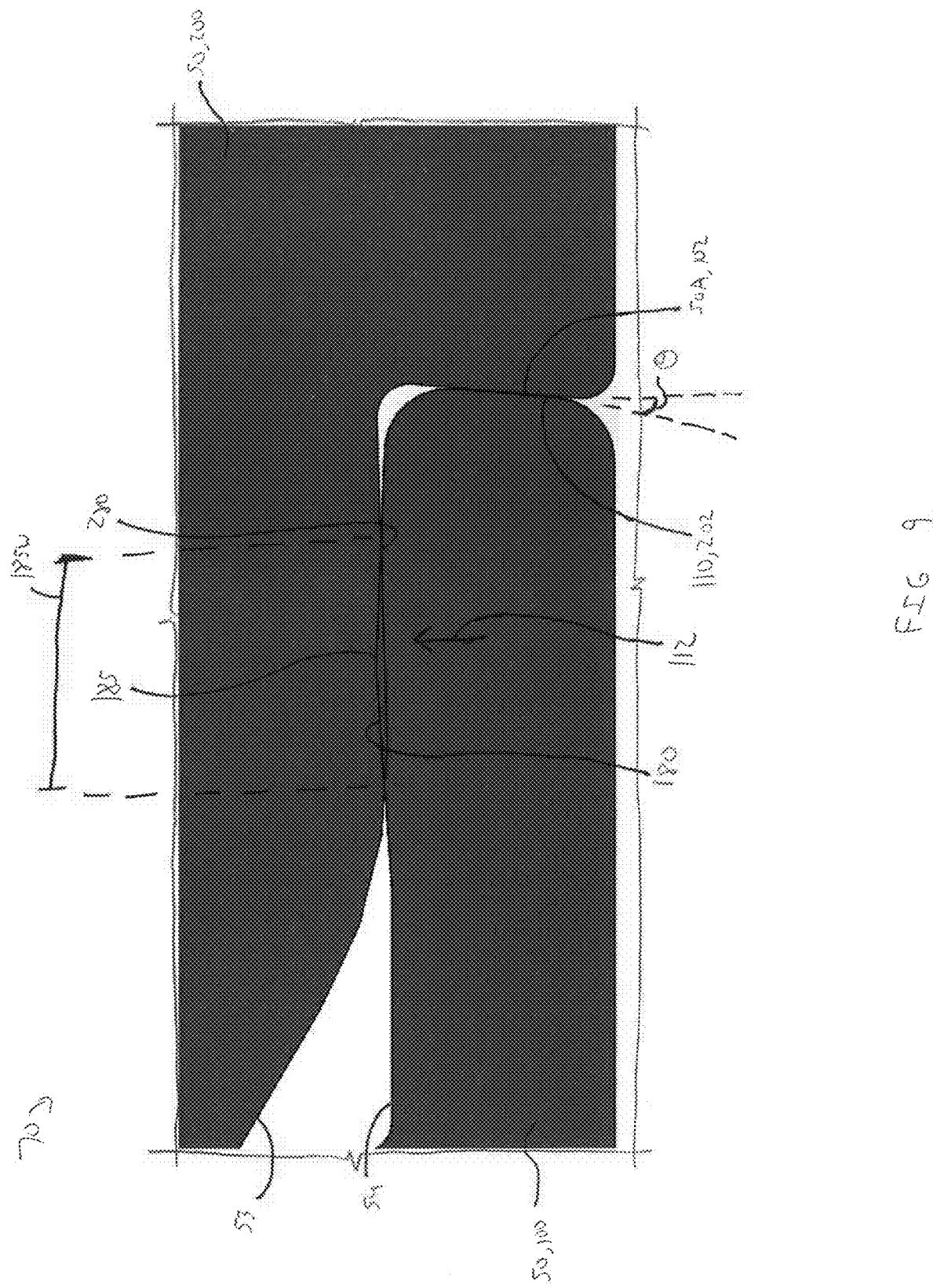
FIG. 9 is a side cross-sectional view of an embodiment of an annular seal of the tool joint of FIG. 3 in accordance with principles disclosed herein.

As shown particularly in FIG. 9, a metal-to-metal annular seal 185 is provided between the annular sealing surface 180 of pin end 100 and the annular sealing surface 280 of box end 200, where annular seal 185 has an axially extending width 185W. Particularly, annular sealing surface 180 of pin end 100 curves radially outwards away from central axis 55 of the drill pipe joint 50. In this embodiment, curved sealing surface 180 has a radius of curvature approximately between 8" to 12"; however, in other embodiments, the radius of curvature of sealing surface 180 may vary. The curvature of annular sealing surface 180 reduces the width 185W of annular seal 185, thereby increasing the contact pressure between surfaces 180 and 280 and the seal integrity of the annular seal 185 formed therebetween.

Annular seal 185 serves to restrict fluid communication between the central passages 52 of adjoined drill pipe joints 50 and the environment surrounding drill pipe joints 50. In this embodiment, annular seal 185 comprises a gas tight seal. Additionally, annular sealing surface 280 of box end 200 is inclined (frustoconical) relative to central axis 55 such that the axial end of sealing surface 280 proximal inner shoulder 202 has a diameter that is greater than the diameter of the axial end of sealing surface 280 distal inner shoulder 202. In this embodiment, sealing surface 280 of box end 200 is disposed at an angle of approximately 1° to 2° relative to central axis 55; however, in other embodiments, the angle of sealing surface 280 may vary, including an angle of 0° relative to central axis 55. In still other embodiments, sealing surface 280 of box end 200 may comprise a convex curved surface similar in geometry as the sealing surface 180 of pin end 100.

In the embodiment shown in FIGS. 2-9, the inner shoulder 102 of pin end 100 and the inner shoulder 202 of box end 200 are each angled relative to the central axis 55 of drill pipe joint 50. Particularly, inner shoulder 102 of pin end 100 and the inner shoulder 202 of box end 200 radially extend at a non-zero angle θ relative to an axis extending orthogonally from central axis 55. In other words, inner shoulder 102 and inner shoulder 202 are each disposed at the angle θ from orthogonal of central axis 55. Thus, inner shoulder 102 of pin end 100 and inner shoulder 202 are disposed at an acute or obtuse angle relative to the central axis 55 of their respective drill pipe joints 50. In this embodiment, angle θ is approximately 4° to 7°; however, in other embodiments, the angle θ at which inner shoulders 102 and 202 are disposed may vary. With inner shoulder 102 of pin end 100 and inner shoulder 202 of box end 200 each disposed at angle θ, an angled or frustoconical interface 110 is formed at the interface between inner shoulders 102 and 202 when the pin end 100 and box end 200 of adjacent drill pipe joints 50 are threadably coupled to form connection 70, as shown in FIG. 9.

Upon forming the connection 70 between adjacent drill pipe joints 50, opposing axial forces are applied to pin end 100 and box end 200 at least partly as a result of forcible contact between inner shoulder 102 of pin end 100 and inner shoulder 202 of box end 200. Further, the angled interface 110 formed between inner shoulder 102 of pin end 100 and inner shoulder 202 of box end 200 translates a portion of the axially directed force applied to pin end 100 at inner shoulder 102 into a radially outwards directed force (indicated by arrow 112 in FIG. 9). The radially outwards directed force 112 is directed towards the sealing surface 280 of box end 200, thereby increasing the contact pressure between sealing surface 280 of box end 200 and sealing surface 180 of pin end 100, and thus, the seal integrity of the annular seal 185 formed between sealing surfaces 180 and 280.

Figure 10:
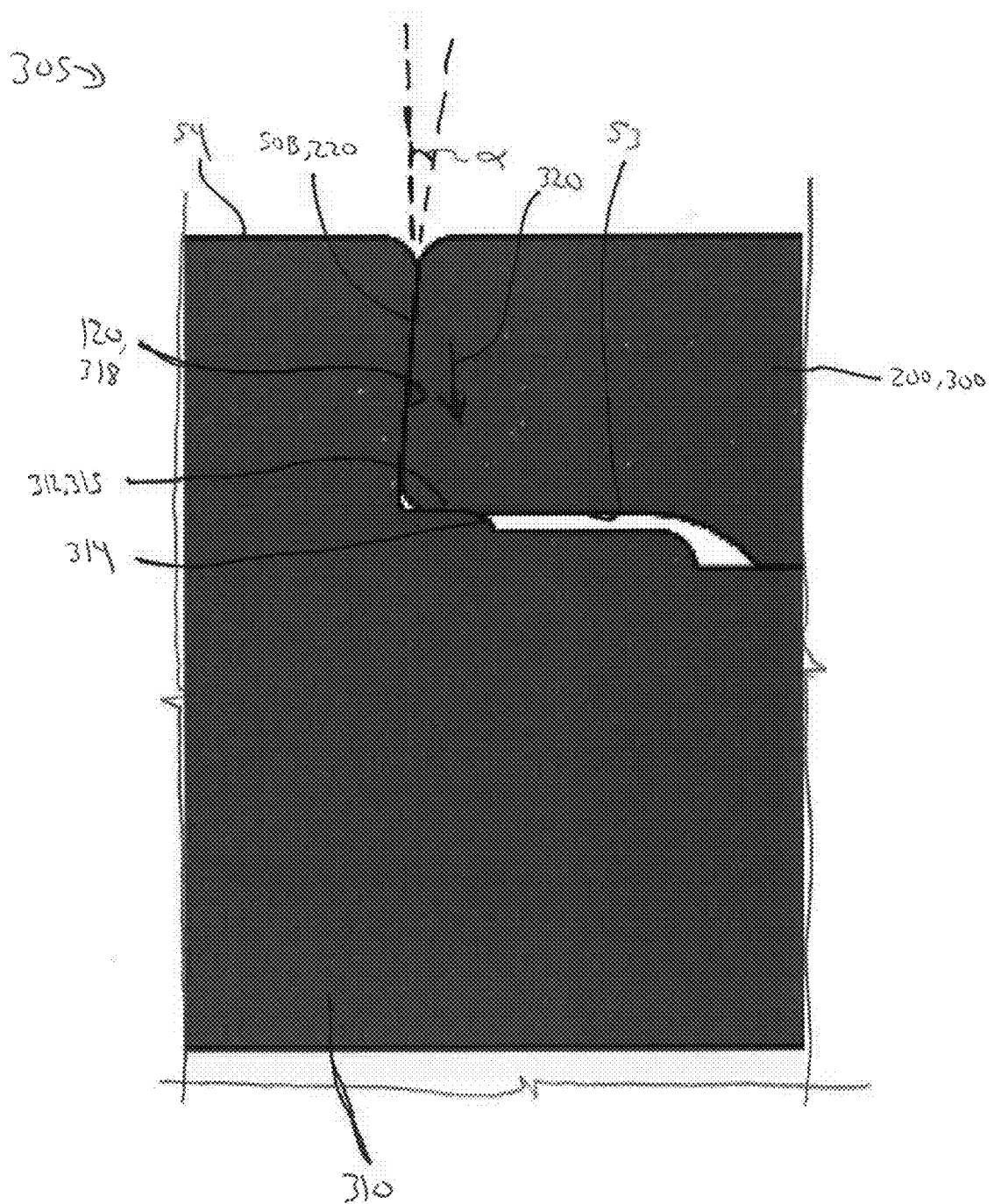
FIG. 10 is a side cross-sectional view of another embodiment of an annular seal of a in accordance with principles disclosed herein.

Referring to FIG. 10, another embodiment of a drill pipe joint 300 for forming tool joints or connections 305 therebetween. Drill pipe joint 300 includes features in common with drill pipe joint 50 shown in FIGS. 2-9, and shared features are labeled similarly. In the embodiment of FIG. 10, drill pipe joint 300 includes box end 200 and a pin end 310. Pin end 310 is similar to pin end 100 shown in FIG. 4 except that pin end 310 includes an annular second or outer sealing surface 312 disposed adjacent outer shoulder 120 of pin end 310. Thus, in this embodiment, sealing surface 180 of pin end 310 comprises a first or inner sealing surface 180. Outer sealing surface 312 of pin end 310 is formed on a radially outwards extending annular shoulder 314 of pin end 310 and sealingly engages the inner surface 53 of the box end 200 of a corresponding drill pipe joint 300. In this arrangement, a second or outer metal-to-metal annular seal 315 is provided between the outer sealing surface 312 of pin end 310 and the inner surface 53 of box end 200. In this embodiment, outer seal 315 compliments the first or inner seal 185 formed between the annular sealing surface 180 of pin end 310 and the annular sealing surface 280 of box end 200, thereby providing a pair of annular seals 185, 315 that seal the central passages 52 of adjacent drill pipe joints 300 from the surrounding environment.

Additionally, in this embodiment the outer shoulder 120 of pin end 310 and the outer shoulder 220 of box end 200 are each angled relative to the central axis 55 of drill pipe joint 300. Particularly, outer shoulder 120 of pin end 310 and the outer shoulder 220 of box end 200 radially extend at a non-zero angle α relative to an axis extending orthogonally from central axis 55. Thus, outer shoulder 120 of pin end 310 and outer shoulder 220 of box end 200 are disposed at an acute or obtuse angle relative to the central axis 55 of their respective drill pipe joints 50. In this embodiment, angle α is approximately 4° to 7°; however, in other embodiments, the angle θ at which inner shoulders 102 and 202 are disposed may vary. With outer shoulder 120 of pin end 310 and outer shoulder 220 of box end 200 each disposed at angle α, an angled or frustoconical interface 318 is formed at the interface between outer shoulders 120, 220 when the pin end 310 and box end 200 of adjacent drill pipe joints 300 are threadably coupled to form connection 305. The angled interface 318 translates a portion of the axially directed force applied to pin end 310 at outer shoulder 120 into a radially inwards directed force (indicated by arrow 320 in FIG. 10). The radially inwards directed force 320 is directed against the outer sealing surface 312 of pin end 310, thereby increasing the contact pressure and seal integrity between sealing surface 312 and the inner surface 53 of box end 200.

While embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A tubular member for threadably engaging another tubular member to form a tubular string, comprising:
    a first end comprising a helical female thread formed in an outer surface of the tubular member, wherein the female thread comprises:
        a slot extending radially inwards from the outer surface and defined by an opposing pair of planar inner surfaces; and
        a root extending radially inwards from the slot and defined by a concave inner surface, wherein an interface formed between the opposing pair of planar inner surfaces of the slot and the concave inner surface of the root forms a pair of convex shoulders;
        wherein the root has a maximum width that is greater than a maximum width of the slot;
    a second end opposite the first end and comprising a helical male thread formed on an inner surface of the tubular member, wherein the male thread comprises:
        a shank extending radially outwards from the inner surface and defined by an opposing pair of planar outer surfaces; and
        a notch extending radially outwards from the shank and defined by a convex outer surface, wherein an interface formed between the opposing pair of planar outer surfaces of the shank and the convex outer surface of the notch forms a pair of concave recesses configured to interlock with the convex shoulders of the female thread;
        wherein the notch has a maximum width that is greater than a maximum width of the shank.

2. The tubular member of claim 1, wherein the first end comprises a pin end and the second end comprises a box end.

3. The tubular member of claim 1, wherein the maximum width of the notch of the male thread is greater than the maximum width of the slot of the female thread.

4. The tubular member of claim 1, wherein the first end comprises a plurality of the female threads and the second end comprises a plurality of the male threads.

5. The tubular member of claim 1, wherein:
    the first end comprises an annular shoulder and an annular sealing surface positioned axially between the female thread and the shoulder; and
    wherein the annular shoulder is disposed at an acute angle relative to a central axis of the tubular member and configured to provide a radially directed force against the sealing surface in response to coupling the tubular member with an adjacent tubular member.

6. The tubular member of claim 1, wherein the male thread and the female thread each comprise a dovetail shaped cross-sectional profile.

7. A tubular member for threadably engaging another tubular member to form a tubular string, comprising:
    a first end comprising a helical female thread formed in an outer surface of the tubular member, wherein the female thread comprises:
        a slot extending radially inwards from the outer surface and defined by an opposing pair of parallel planar inner surfaces;
        a root extending radially inwards from the slot, wherein the root is defined by a concave inner surface; and
        a pair of convex curved shoulders extending between the slot and the root;
    a second end opposite the first end and comprising a helical male thread formed on an inner surface of the tubular member, wherein the male thread comprises:
        a shank extending radially outwards from the inner surface and defined by an opposing pair of parallel planar outer surfaces;
        a notch extending radially outwards from the shank, wherein the notch is defined by a convex outer surface; and
        a pair of concave curved shoulders extending between the shank and the notch.

8. The tubular member of claim 7, wherein:
    the root of the female thread has a maximum width that is greater than a maximum width of the slot of the female thread; and the notch of the male thread has a maximum width that is greater than a maximum width of the shank of the male thread.

9. The tubular member of claim 7, wherein the first end comprises a plurality of the female threads and the second end comprises a plurality of the male threads.

10. The tubular member of claim 7, wherein:
the first end comprises an annular shoulder and an annular sealing surface positioned axially between the female thread and the shoulder; and
wherein the shoulder is disposed at an acute angle relative to a central axis of the tubular member to provide a radially directed force against the sealing surface in response to coupling the tubular member with an adjacent tubular member.

11. The tubular member of claim 7, wherein the first end comprises a pin end and the second end comprises a box end.

12. A tubular member for threadably engaging another tubular member to form a tubular string, comprising:
a first end comprising an annular first shoulder, a first helical thread, and an annular first sealing surface positioned axially between the first helical thread and the first shoulder, wherein the first shoulder is disposed at an acute angle between 4 degrees and 7 degrees relative to a central axis of the tubular member to provide a radially directed force against the first sealing surface in response to coupling the tubular member with an adjacent tubular member.

13. The tubular member of claim 12, wherein:
the first end further comprises an annular second sealing surface axially spaced from the first sealing surface and an annular second shoulder axially spaced from the first shoulder, and wherein the second sealing surface is positioned axially between the first helical thread and the second shoulder; and
the second shoulder is disposed at an acute angle relative to the central axis of the tubular member to provide a radially directed force against the second sealing surface in response to coupling the tubular member with an adjacent tubular member.

14. The tubular member of claim 12, wherein the first helical thread comprises:
a slot extending radially inwards from the outer surface; and
a root extending radially inwards from the slot, and wherein the root has a maximum width that is greater than a maximum width of the slot.

15. The tubular member of claim 14, wherein the first helical thread comprises:
a pair of convex curved shoulders extending between the slot and the root;
wherein the root of the first helical thread is defined by a concave inner surface.

16. The tubular member of claim 12, further comprising:
a second end opposite the first end that comprises an annular second shoulder, a second helical thread, and an annular second sealing surface positioned axially between the second helical thread and the second shoulder, wherein the second shoulder is disposed at an acute angle relative to the central axis of the tubular member to provide a radially directed force against the second sealing surface in response to coupling the tubular member with an adjacent tubular member.

17. The tubular member of claim 12, wherein the second helical thread comprises:
a shank extending radially outwards from the inner surface; and
a notch extending radially outwards from the shank, and wherein the notch has a maximum width that is greater than a maximum width of the shank.

18. The tubular member of claim 12, wherein the first sealing surface curves radially outwards from the central axis of the tubular member.

19. The tubular member of claim 18, wherein a radius of curvature of the first sealing surface is between 8 inches and 12 inches.

* * * * *